S. B. HAZARD.
HAND CART.
APPLICATION FILED AUG. 27, 1908.
1,029,365.
Patented June 11, 1912.
3 SHEETS—SHEET 1.
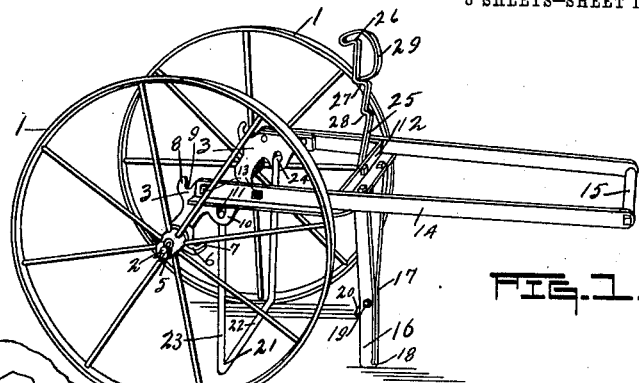
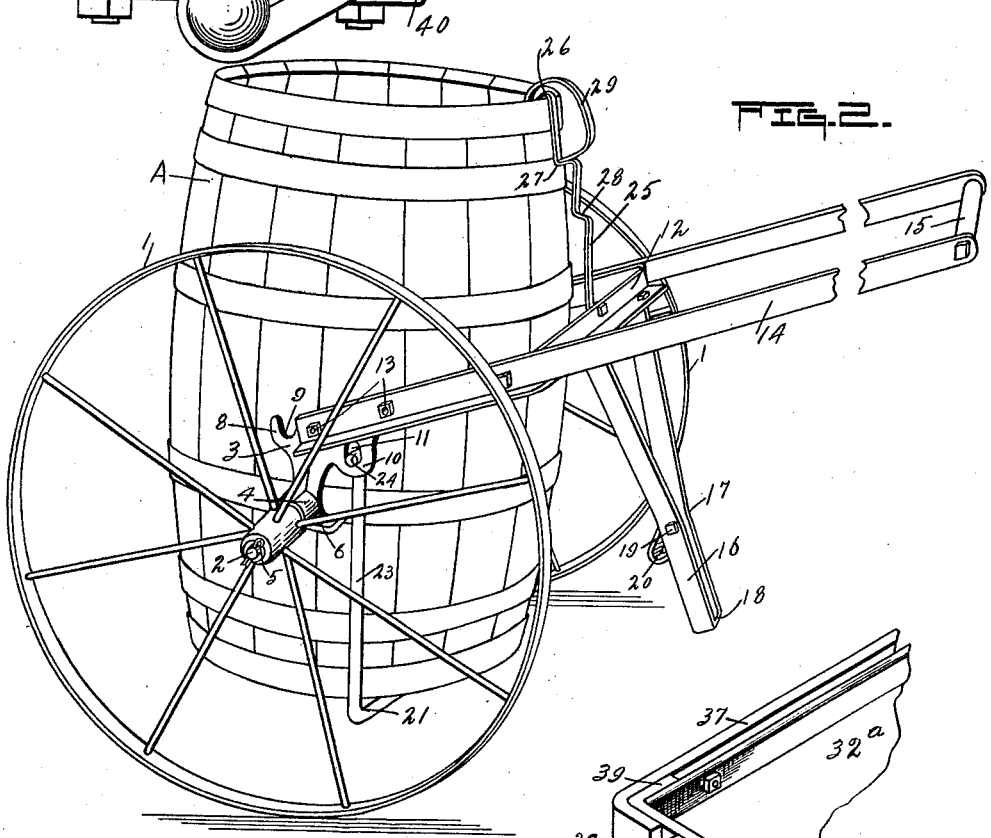

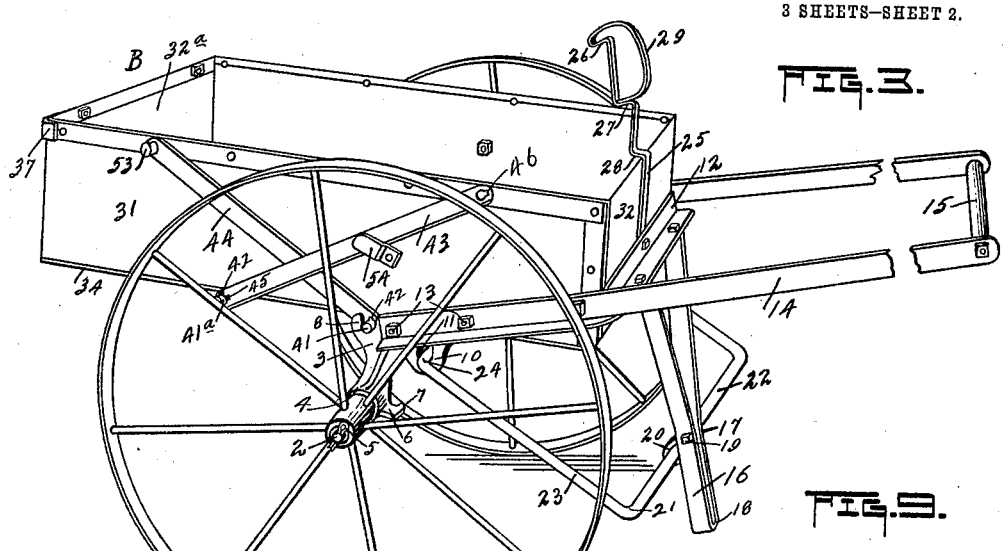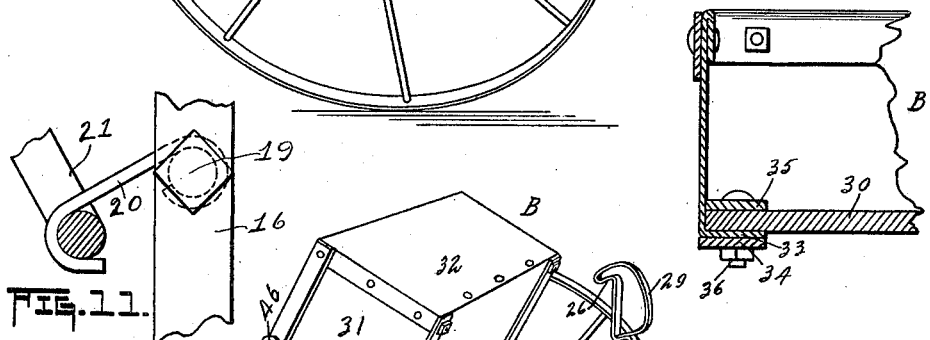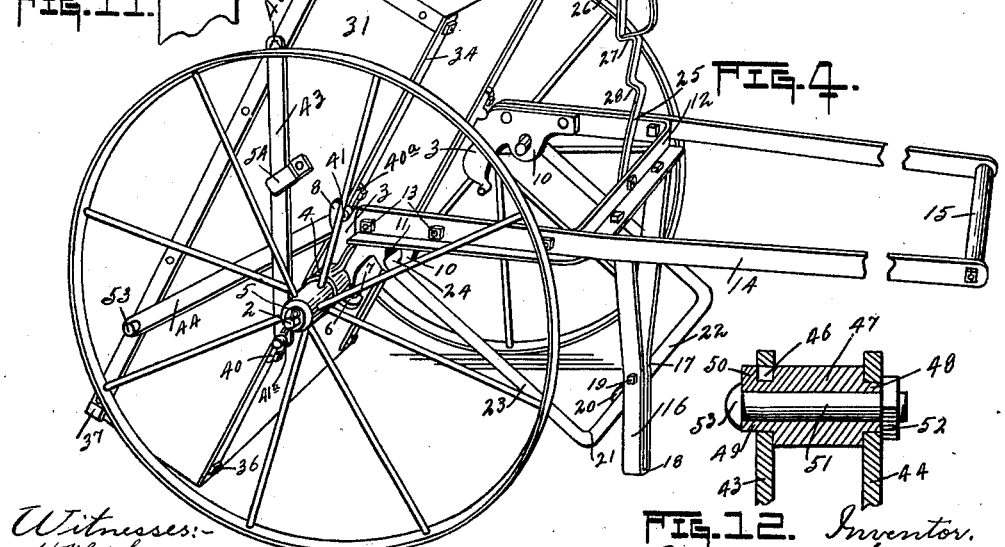

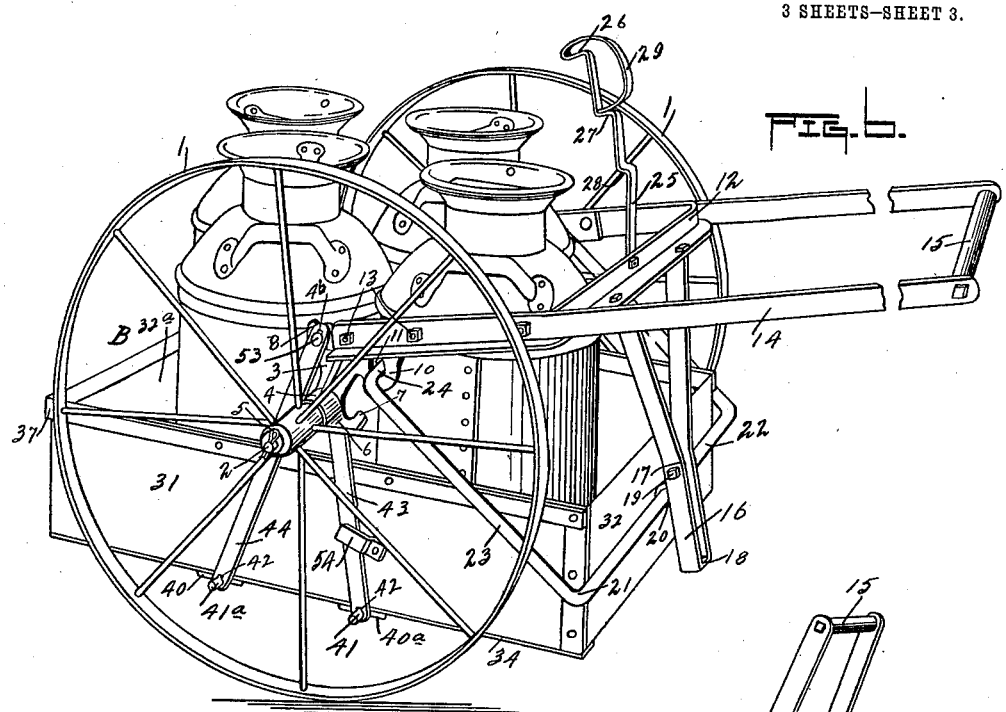
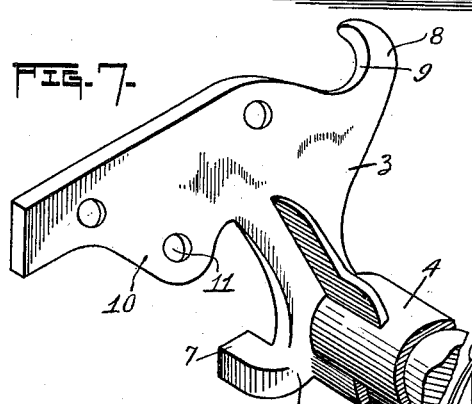
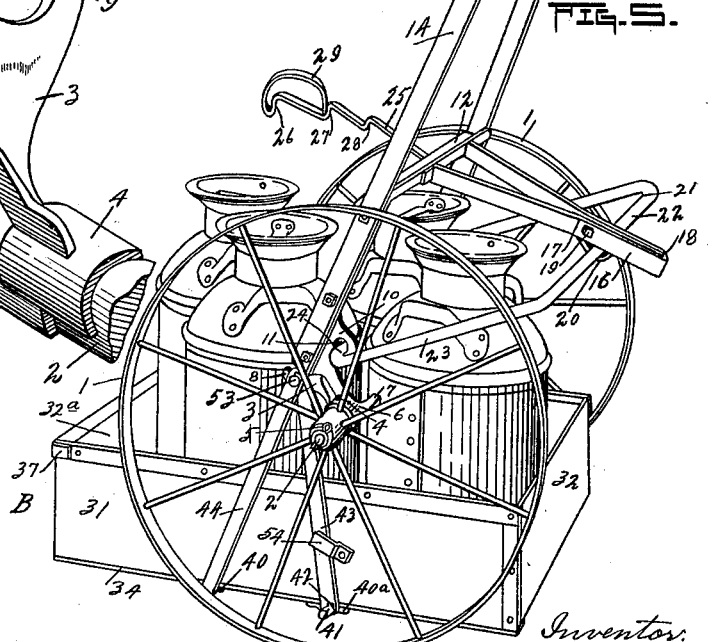

UNITED STATES PATENT OFFICE.

SAMUEL B. HAZARD, OF PEORIA, ILLINOIS.

HAND-CART.

1,029,365.  Specification of Letters Patent.  Patented June 11, 1912.

Application filed August 27, 1908. Serial No. 450,512.

*To all whom it may concern:*

Be it known that I, SAMUEL B. HAZARD, a citizen of the United States, residing at Peoria, in the county of Peoria and State of Illinois, have invented certain new and useful Improvements in Hand-Carts; and I do hereby declare that the following is a full, clear, and exact description of the invention, which will enable others skilled in the art to which it appertains to make and use the same.

This invention has reference to carts and relates particularly to a two-wheel cart, which may be used as a push-cart, a carry-all, or as a barrel-cart; in other words, the invention has for its object to provide a two-wheel cart, which shall be interchangeable from a push-cart to a carry-all, or as a barrel-cart.

A further object of the invention is to provide a cart which shall be interchangeable for use as a push-cart, carry-all or barrel-cart, and the change made from one to the other, without making any alterations in the cart, which is to say, without removing any bolts, nuts, pins or similar securing devices.

The invention has for its further object an interchangeable cart for use as a push-cart, carry-all or barrel-cart, and when used as the latter, barrels may be picked up by means on the cart, and the barrel held securely thereon to be moved from place to place, without any attachments whatever being first secured to the barrels; in other words, barrels of different heights, without any supplemental attachments or ears, may be lifted and conveyed from place to place by this cart.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a greatly reduced perspective view of my improved interchangeable push-cart, carry-all and barrel-cart; Fig. 2 is a perspective view similar to Fig. 1, although on a somewhat larger scale, and showing the cart used as a barrel-cart; Fig. 3 is a perspective view similar to Fig. 1, although on a somewhat larger scale, and showing the cart used as a push-cart; Fig. 4 is a view somewhat similar to Fig. 3, but showing the box of the push-cart in a dumping position; Fig. 5 is a perspective view of the cart in a position for attaching a box thereto, to use the same as a carry-all; Fig. 6 is a perspective view of the cart as it would appear when used as a carry-all; Fig. 7 is an enlarged perspective view of one of two members, to which are pivotally connected a yoke for supporting a barrel, and provided with hooks for supporting a box, when the cart is used as a push-cart or carry-all; Fig. 8 is a detail perspective view of one corner of the box, which is provided with a removable end gate; Fig. 9 is a partial vertical and transverse section of the box shown in Figs. 3, 4, 5 and 6; Fig. 10 is a detail elevation, showing the mode of attaching one of the side supporting straps to the box, which appear in Figs. 3, 4, 5 and 6; Fig. 11 is a detail showing a hook attached to the leg of the cart, which is used for holding a bail up and out of the way; Fig. 12 is a sectional detail of parts attached to one of the straps of the box for the cart, and with which a similar strap has a detachable connection.

Like numerals of reference indicate corresponding parts throughout the figures.

The cart is shown composed of two ground wheels, each of which are designated as 1, and carried on the short horizontally disposed axles or spindles 2, which, at their inner end may be attached to or formed integral with brackets 3. As shown in Fig. 7, the brackets 3 are provided with hub guards 4, so that when the hubs of the wheels 1 are slipped on to the short axles or spindles 2, the inner ends of the hubs will ride beneath a portion of the guards 4, and cotter pins 5 are employed, being passed through the outer end of the short shafts or spindles 2, for retaining the ground wheels thereon, and in the position shown in Fig. 1.

The brackets 3 have the radially extending ears 6 and the inwardly and axially extended lugs 7, serving a purpose which will be further explained, and the said brackets are provided at their forward upper portions with open hooks 8, and semi-circular receiving seats 9; while depending from the upper rear portion of said brackets, are shown ears 10 with perforations 11; the object and purposes of the open hooks 8 and the ears 10, will be further explained.

The body of the cart consists preferably of the U shaped angle iron frame 12, the forward parallel portions of which are secured respectively, to the opposite brackets 3, by being bolted thereto, as at 13, and when secured, determines the width cross-wise of the cart, or the distance between the opposite ground wheels 1. The frame further includes a pair of reach-bars 14, which, at one end, are secured by the previously mentioned bolts 13, to the U frame 12, and extend back a suitable distance from said U frame, as shown, and preferably converge so as to bring their rear ends somewhat closer together and the same are connected by the cross-piece 15, serving as a handhold, by which the cart may be moved from place to place and otherwise manipulated when picking up a barrel or attaching the cart to a box, when using the cart as a pushcart or carry-all, all of which will be fully explained. The cart further includes as a portion of its frame work, a leg or standard, which is indicated as 16, being preferably a bar of metal bent into suitable shape, with the upper ends thereof bolted to the U frame 12, in the manner shown, and converging to a point indicated as 17, where the opposite portions of the bar are spaced a short distance apart, from which point they extend parallel for a suitable distance to where the bar is bent, as shown at 18, which is that portion of the leg which will rest upon the floor or ground, when the cart is in the normal position shown in Fig. 1. At the point 17 on the leg, a bolt 19 is passed through the opposite portions thereof, for the purpose of pivotally securing a hook 20 thereto, as best seen in Fig. 11, which said hook serves as a means for retaining a bail 21 up and out of the way, when the cart is being used for a push-cart or carry-all, as shown in Figs. 5 and 6, but is so constructed that said bail may be released from the hook, when it is intended to use the cart for a barrel-cart, as shown in Fig. 2. This bail is preferably a rod, which has the horizontal portion 22, and the spaced and parallel portions 23, the free ends of which are bent at right angles, as at 24, and hooked in the ears 10 of the brackets 3, by being passed through the perforations 11, therein, as shown in Figs. 1 and 2.

There is attached to and supported by the cross piece of the frame 12, a spring engaging arm 25, which extends up therefrom, and said spring arm is provided with the plurality of hooks or shoulder engaging portions 26, 27 and 28, which are suitably spaced apart throughout the length of said spring arm, and although I have only shown three hooks on the spring arm, it is understood of course, that as many more may be provided as will be desirable, and spaced any distance apart that may be required. This spring arm, as shown, is made from a bar of metal, which is of suitable thickness and width, and at the point 28, is bent outwardly to form a shoulder, and then upwardly, and at 27, is again bent outwardly in the direction in which the bar is bent at 28, to form a shoulder, and then upwardly, and at the point 26, is bent forwardly and slightly downwardly and then back upon itself, with the bar bowed, as at 29, and the end thereof resting upon the upper portion of the shoulder formed by bending the bar outwardly, as at 27. Forming the upper portion of the spring arm 25 with the bowed portion 29, as shown in Fig. 1, a hand hold is provided by means of which the operator may grip the spring arm whenever it is found necessary.

In Fig. 2, the cart is shown used as a barrel-cart, wherein a barrel, which, for convenience, I will indicate as A, is shown supported or mounted upon the cart, in a manner which I will now explain. It will be observed that the barrel A is without ears or any supplemental attachments whatever. Assuming that the barrel is resting upon the floor, the cart is wheeled up to the barrel after first releasing the bail 21 from the hook 20, and by tilting the barrel up and away from the cart, the cart may be moved into a position like that shown in Fig. 2, when the barrel may be lowered onto the transverse piece 22 of the bail, which will place it in a position to cause the hook 26 of the spring arm 25 to engage the upper edge of the barrel, as shown in Fig. 2, for the purpose of firmly retaining the barrel in that position on the cart, when a person may, by engagement with the hand hold 15, connecting the reach bars 14, move the barrel from place to place, without any apparent effort, even though the barrel may weigh considerable, in fact, in actual commercial use, the cart has been known to be serviceable for the purpose of transporting barrels from place to place, which weigh anywhere from three hundred to seven hundred pounds. Upon reaching the place where it is desired to release the barrel from the cart, the reach bars 14 may be elevated, which will throw the vertical and parallel portions 23 of the bail 21, against the lugs 7 of the brackets 3, which will cause the bail to spring from beneath the barrel A, and said barrel at the same time being released from the hook 26 of the spring arm 25. While the hook 28 of the spring arm 25, in Fig. 3, is shown as a means of retaining a box on the body of the cart, yet both the hooks 27 and 28 may be used for engaging the upper edges of barrels, which may differ in height from that shown in Fig. 2, having been designed especially to adapt the cart to three different makes of barrels, although, as previously stated, said spring arm may have as many hooks as desirable, and they may be arranged at various distances apart to adapt the cart to many and various sizes of barrels.

Calling attention to Figs. 3 and 9, a box is shown which, for convenience, will be referred to as B. This box is of suitable width and length and of a desirable height, and is preferably constructed with a wood bottom 30, metal sides 31, and ends 32 and 32$^a$. The end 32 being fixed and the opposite end 32$^a$ being removable to serve as an end gate, as shown in Fig. 8. The metal forming the sides of the box, is bent inwardly and beneath the bottom 30, as at 33, see Fig. 9, and a reinforcing strip 34 is placed below and adjacent to the inturned portion of the sides, which extend from end to end of the box, as shown in Fig. 4, and corresponding strips 35 are placed on the inside of the box, upon the bottom thereof, and the said strips 35, 34 and the inturned portions of the sides 33 are bolted, as at 36, to the bottom of said box.

The end gate 32$^a$, which is shown in detail in Fig. 8, has secured to the upper outside edge thereof, a strap 37, which is bent at right angles, as at 38, so that when the end gate is placed in position in the box, it will bear against inturned portions 39 of the box sides which will be seated between the gate and the strap 37, and with the right angle portions 38 of said strap, bearing against the sides of the box, as shown in Figs. 3 and 8.

Secured to the underside of the strips 34 beneath the box, are brackets 40 and 40$^a$ from which project outwardly the short stems 41 and 41$^a$, which are provided at a suitable point thereon with the radially extended lugs 42. On the respective stems 41 and 41$^a$ are adapted to be carried the straps 43 and 44, which said straps at their lower ends, are provided with the key-hole shaped slots 45, to adapt them to be passed on to the stems 41 and 41$^a$ between the lugs 42 and the body of the brackets 40 and 40$^a$. It will be understood that to pass the straps 43 and 44, onto the stems 41 and 41$^a$, the key-hole shaped slots 45, must coincide with the lugs 42, and that after the straps have been placed on the stems, by moving them to one side or the other, will place the key-hole shaped slots in a position so as to prevent the accidental disconnection of the straps from the stems 41 41$^a$. To disconnect the said straps, they will be moved to a position where the key-hole shaped slots will coincide with the lugs 42 when the straps may be easily removed from the stems 41 and 41$^a$.

In the opposite end of the strap 43, there is provided a key-hole shaped slot 46 similar to that shown at 45, while to the opposite end of the strap 44, there is secured a sleeve 47, which I will now proceed to describe. This sleeve 47 at its opposite ends is reduced, as at 48 and 49, see Fig. 12, and projecting radially from the reduced portion 49 of said sleeve, is a lug 50. To secure the sleeve 47 to the strap 44, said strap is placed over the reduced portion 48 of the sleeve, and a bolt 51 is inserted from the other end of the sleeve therethrough, with a nut 52 engaging and secured to the end of the bolt and bearing against the outer face of the strap 44, which will securely hold said strap 44 on the sleeve. I preferably employ a bolt 51 with a round head 53, which said head shall not be any larger than the outside diameter of the reduced end portion 49 of the sleeve; the object of this is as follows: It is intended, as shown in Figs. 5 and 6, to unite the upper end of the strap 43, to the sleeve 47, attached to the strap 44. To do this, the two ends of the straps 43 and 44, are brought opposite each other, and the sleeve 47 is turned so as to bring the lug 50 opposite the reduced portion of the key-hole shaped slot 46, when the end of the strap 43 may be slipped over the reduced end 49 of the sleeve 47, and said sleeve turned to a position so that the lug 50 will not coincide with the reduced portion of the key-hole shaped slot 46 in the bar 43, when the said bars 43 and 44 may be united and retained in that position shown in Figs. 5 and 6. To release the bars, all that is necessary to do is to again rotate the sleeve 47, so that the lug 50 thereof, will coincide with the reduced portion of the key-hole slot 46, when the bar 43 may be again slipped off of the sleeve 47.

When the straps 43 and 44 are disconnected, they are placed in the position shown in Figs. 3 and 4, with the strap 43 held between a cleat 54 and the body of the box, which said cleat is attached to the side of the box, as shown in the said figures, and the strap 44 is held in its position by the pressure of the strap 43 against the strap 44, which said strap 44 is placed between the strap 43 and the body of the box, as shown. When the cart is used as a push-cart, the bail 21 is held up out of the way by the hook 20, as shown in Fig. 3, and the box is stood on its end, which is provided with the removable end gate 32$^a$, and the cart moved up into a position so that the open hooks 8 of the brackets 3, will engage the spindles 41 and cause them to be seated in the semi-circular seat portions 9, formed by the open hooks 8, when the box is thrown into the position in which it is shown in Fig. 3, when the end 32 of the box, will be caught under the hook or engaging lug 28 of the spring arm 25, and firmly held in that position. The width of the box is only sufficient to allow it to be placed between the brackets 3, and its length is such, that when it is secured in position on the cart, the end 32 will be adjacent to the vertical portion of the spring arm 25, between the frame 12 and the hook or engaging lug 28, which said hook, as described, holds the box on the frame of the cart. It being desired to dump whatever material is in the box therefrom, by taking hold of the bowed portion 29 of the spring arm 25, said arm may be drawn backward, so as to release the hook or engaging lug 28 from the box, when it will assume that position which is shown in Fig. 4, and if the end gate 32ᵃ has been previously removed by drawing the cart backward, all material in the box will be discharged therefrom. The center of gravity of the box is between the end having the end gate 32ᵃ and the spindles 41, so that the box will dump of its own weight, in that position shown in Fig. 4, upon the release of the spring arm therefrom, as above described.

Figs. 5 and 6 show the cart when used as a carry-all, wherein the box 31 is again used, but in a little different manner from that shown as a push-cart in Figs. 3 and 4. To use the cart as a carry-all, the box 31 is placed on the floor or the ground, in the manner in which it is shown in Fig. 5, with the straps 43 and 44 connected at their outer ends in the manner previously described. The cart is then placed in a position so that the open hooks 8 of the brackets 3, will engage the sleeves 47 and seat the said sleeves in the semi-circular seat portions 9, formed by the open hooks 8. When this is done, the reach bars 14 are lowered into the position shown in Fig. 6, which will elevate the box 31 off of the floor or the ground, in the manner shown in Fig. 6, when the cart with the box and the load therein, may be transported from place to place, and the cart disconnected from the box, by again raising the reach bars 14 into that position shown in Fig. 5, when the cart may be backed away from the box. Figs. 5 and 6 show the cart used for dairy purposes, or upon the farm, when it is desired to transport filled milk cans from one place to the other. To disconnect the cart from the box 31, when it is used as a push-cart, substantially the same operation is gone through, as it is when it is desired to disconnect the cart from the box, when the cart is used as a carry-all. That is to say, the box as it is shown in Fig. 4, is allowed to rest on its ends, when the reach bars 14 are thrown into that position in which the cart is shown in Fig. 5, when the cart may be backed away from the box, disconnecting the open hook portions 8 of the brackets 3, from the spindles 41.

From the foregoing description, it is obvious that the cart without any changes whatever being made thereto, by the removing of bolts, nuts or pins, may be quickly interchanged for use as a barrel-cart, a push-cart or a carry-all, the bail 21 being lowered when used as a barrel-cart and raised and held out of position when used as a push-cart or carry-all; the spring arm being employed both when the cart is used as a barrel-cart or as a push-cart, and when it is desired to use the cart as a carry-all, it is only necessary to change the straps 43 and 44 from that position shown in Fig. 3, to the position shown in Figs. 5 or 6. The detail construction of the box 31, is immaterial, except that it must be provided with some such means as the spindles 41, to enable the box to be secured in position on the cart, and further provided with some such means as the straps 43 and 44 to be connected at their upper ends, so that the cart may be used as a carry-all.

I am aware that barrel-carts are not new, but at the same time, I do not know of any barrel-cart where different sizes of barrels may be attached to and supported by the cart, without first providing the barrel with ears or some supplemental attachments, to enable the barrel to be supported or secured to the cart; and further, am not aware of a cart which is both useful as a barrel-cart in the manner in which I have stated and which may be also interchanged for use as a push-cart or carry-all.

Having thus fully described my invention, what I claim and desire to secure by Letters Patent of the United States, is:—

1. In a cart of the character described, the combination of a frame, ground wheels connected to said frame, a supporting bail pivotally attached with said frame, and a spring arm extending up from said frame, said arm provided with a plurality of hook engaging portions.

2. In a cart of the character described, the combination of a frame, ground wheels connected with said frame, a supporting bail pivotally attached to said frame, a hook for holding the bail in an inoperative position, and a spring arm extending up from said frame, said arm provided with a plurality of hook engaging portions.

3. In a cart of the character described, the combination of a pair of short axles, ground wheels mounted on said axles, a frame connected with said axles, said frame provided with a pair of open hooks forming semi-circular seat receiving portions, a bail pivotally hung upon said frame, and a spring arm extending up from said frame, said arm provided with a plurality of hook engaging portions.

4. In a cart of the character described, the combination of a pair of brackets each provided with an extension lug, wheel spindles connected with said brackets and ground wheels mounted upon said spindles, a frame connected with said brackets, a supporting bail pivotally connected with said brackets, and adapted when the frame is elevated into a suitable position, to have engagement with the extension lugs of said brackets, and an arm attached to and extending upwardly from said frame, said arm provided with hook engaging portions.

5. In a cart of the character described, the combination of a pair of brackets each provided with an extension lug and with open hooks forming semi-circular seat receiving portions, wheel spindles connected with said brackets and ground wheels mounted upon said spindles, a frame connected with said brackets, a supporting bail pivotally connected with said brackets, and adapted when the frame is elevated in a suitable position, to have engagement with extension lugs of said brackets, an arm extending up from said frame and provided with hook engaging portions, a leg attached to and forming a rest for said frame, and a hook pivotally attached to said leg for holding the bail in an inoperative position.

6. In a cart of the character described, the combination of a pair of brackets each provided with a perforated ear and open hook engaging portions, a lug projecting from each of the brackets, wheel spindles connected with said brackets and ground wheels mounted upon said spindles, a frame connected with said brackets, a supporting bail having a horizontal portion, and vertical supporting portions, which said vertical portions at their ends are pivotally connected with the perforated ears of the brackets, and an arm connected to the extending up from said frame, said arm provided with a plurality of hook engaging portions.

7. In a cart of the character described, a frame comprising an approximately U shaped portion, reach bars connected with said U shaped portion, and joined at their outer ends by a hand hold, brackets connected with said U shaped portion, said brackets provided with open hook engaging portions, wheel spindles connected with said brackets and ground wheels mounted upon said spindles, a supporting bail pivotally connected with said brackets and suspended therefrom, and an arm extending up from said U shaped portion and provided with a plurality of hook engaging portions.

8. In a cart of the character described, the combination of a frame, ground wheels connected to said frame, a supporting bail pivotally connected with said frame and adapted to carry the weight of a barrel, means attached to said frame for engaging the upper edge of a barrel when supported upon said bail, and means with which the bail will engage when the frame is raised into a suitable position for releasing said bail from the barrel, while at the same time said engaging means for the upper edge thereof will be released therefrom.

9. In a cart of the character described, the combination of a frame, ground wheels connected to said frame, a bail pivotally connected with the opposite sides of said frame and hung therebetween, and adapted to support a barrel thereon, an arm connected with the frame and provided with means for engaging the upper edge of the barrel after the same has been placed upon the bail, and lugs connected with said frame adapted to be engaged by the bail when the frame is elevated, which said engagement of the bail with the lug will force said bail from beneath the barrel and while at the same time said barrel will be released from the engaging means on said arm.

10. In combination, in a cart interchangeable for use both as a barrel-cart and a push-cart, of a supporting frame provided with a pair of open hook engaging portions for forming a connection with a box, ground wheels connected with said frame, a bail pivotally connected with said frame for forming a rest for a barrel, a leg attached to said frame and forming a rest therefor, means attached to said leg for holding the bail in an inoperative position, and an arm connected to and extending up from said frame, said arm provided with a plurality of hook engaging portions, any one of which may serve as an engaging means for a box when supported upon said frame, or for a barrel when resting upon the bail attached to said frame.

11. In a cart of the character described, the combination of a supporting frame, ground wheels connected to said frame, a box, means for pivotally and detachably connecting the body of said box with said frame, and a spring arm attached to and extending up from said frame, said arm provided with a hook engaging portion for securing the box in an operative position on said frame, and said arm also provided with a hand hold, whereby it may be manually released from said box.

12. In a cart of the character described, the combination of a frame, ground wheels connected to said frame, a box, a pair of straps connected to each side of the said box, means for detachably connecting the free ends of each pair of straps, and means for pivotally and detachably connecting the frame to the juncture of said straps.

13. In a cart of the character described, the combination of a frame, ground wheels connected to said frame, a box, a pair of straps connected to each side of said box, means for detachably connecting the free ends of each pair of said straps in spaced relation, and means for pivotally and detachably connecting the frame to the juncture of said straps in the space between their free ends.

14. In a cart of the character described, the combination of a frame, ground wheels connected to said frame, brackets connected to said frame having receiving seats, a box, a pair of straps connected to each side of said box, means for detachably connecting the free ends of each pair of straps in spaced relation, said means comprising bolts and sleeves, and said bolts and sleeves being adapted to rest in said receiving seat to pivotally support said box.

In testimony whereof I have affixed my signature, in presence of two witnesses.

SAMUEL B. HAZARD.

Witnesses:
CHAS. W. LA PORTE,
LAURA E. CLAYPOOL.

Copies of this patent may be obtained for five cents each, by addressing the "Commissioner of Patents, Washington, D. C."